Jan. 24, 1956  M. J. ERISMAN  2,732,059
BELT CONVEYOR
Filed Oct. 8, 1951  3 Sheets-Sheet 1

INVENTOR
Maurice J. Erisman
BY L. Donald
ATTORNEY

Jan. 24, 1956  M. J. ERISMAN  2,732,059
BELT CONVEYOR
Filed Oct. 8, 1951  3 Sheets-Sheet 2

INVENTOR
Maurice J. Erisman
BY
ATTORNEY

Jan. 24, 1956
M. J. ERISMAN
2,732,059
BELT CONVEYOR
Filed Oct. 8, 1951
3 Sheets-Sheet 3
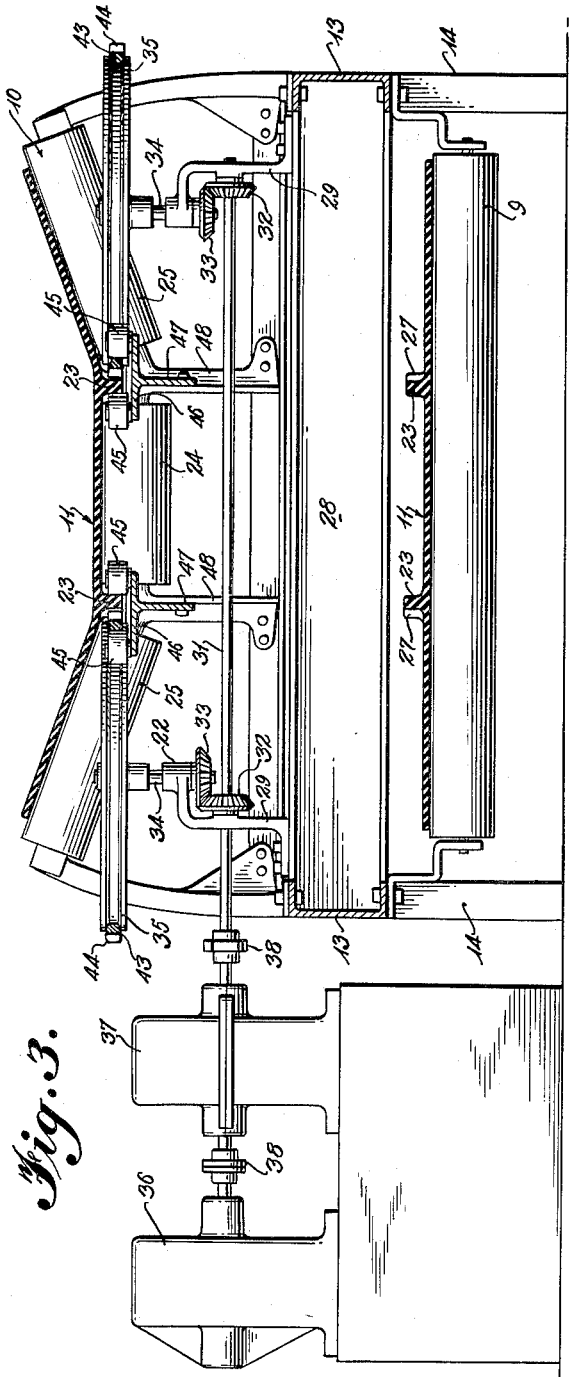
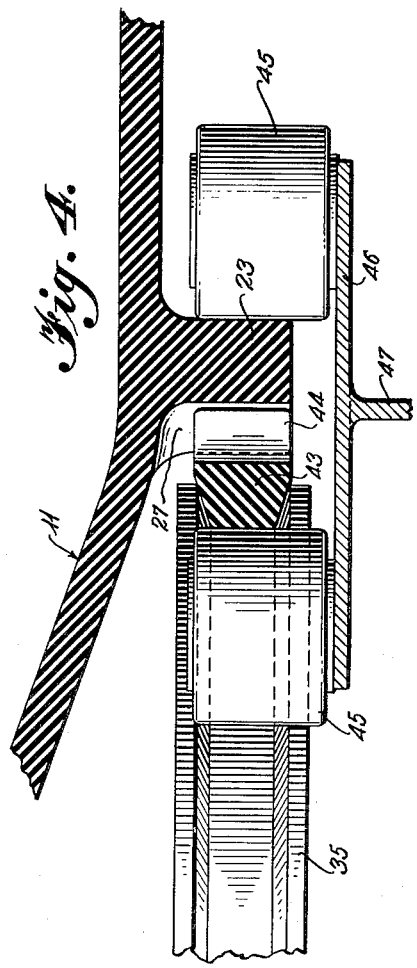
INVENTOR
*Maurice J. Erisman*
BY
ATTORNEY

United States Patent Office 2,732,059
Patented Jan. 24, 1956

2,732,059

BELT CONVEYOR

Maurice J. Erisman, Oak Park, Ill., assignor to Link-Belt Company, a corporation of Illinois Application October 8, 1951, Serial No. 250,321

9 Claims. (Cl. 198—203)

This invention relates to new and useful improvements in belt conveyors designed particularly for transporting materials over great distances, and deals more specifically with the novel construction of the conveyor belt and its drive mechanism.

The primary object of the invention is to provide a belt conveyor having drive mechanism which positively engages the belt so as to prevent slippage between the mechanism and the belt.

A further object of the invention is to provide a belt conveyor which may be positively driven at any point or points along its length without engaging or obstructing the load carrying surface of the belt.

Still another object of the invention is to provide a belt conveyor that is positively driven in such a manner as to distribute the tension forces in the belt along the length and width of the belt to thereby eliminate the concentration of such forces in one portion of the belt and to permit the use of extremely long belt conveyor installations.

More specific objects of the invention are to provide a belt conveyor having its belt and cooperating drive or drives arranged for positive engagement therebetween at one or more points along the length of the conveyor, said positive engagement occurring inwardly of the non-load carrying surface of the belt and at spaced intervals across its width.

Other objects and advantages of the invention will be apparent during the course of the following description.

Figure 1:
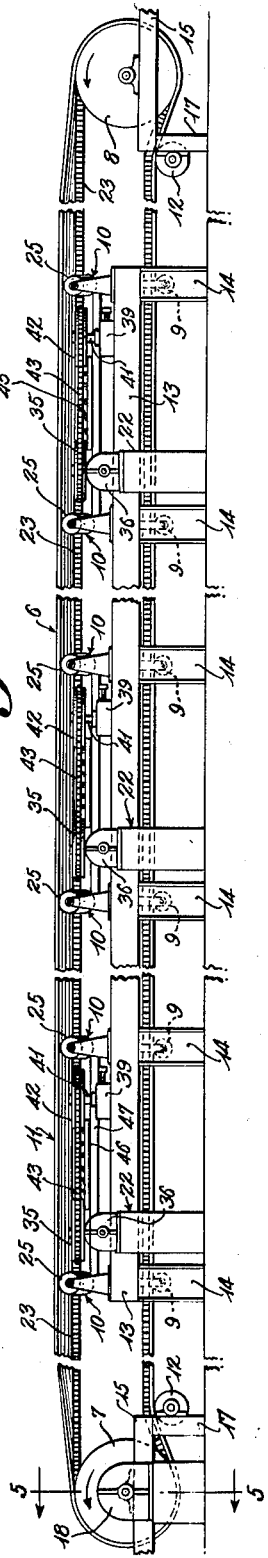
Figure 2:
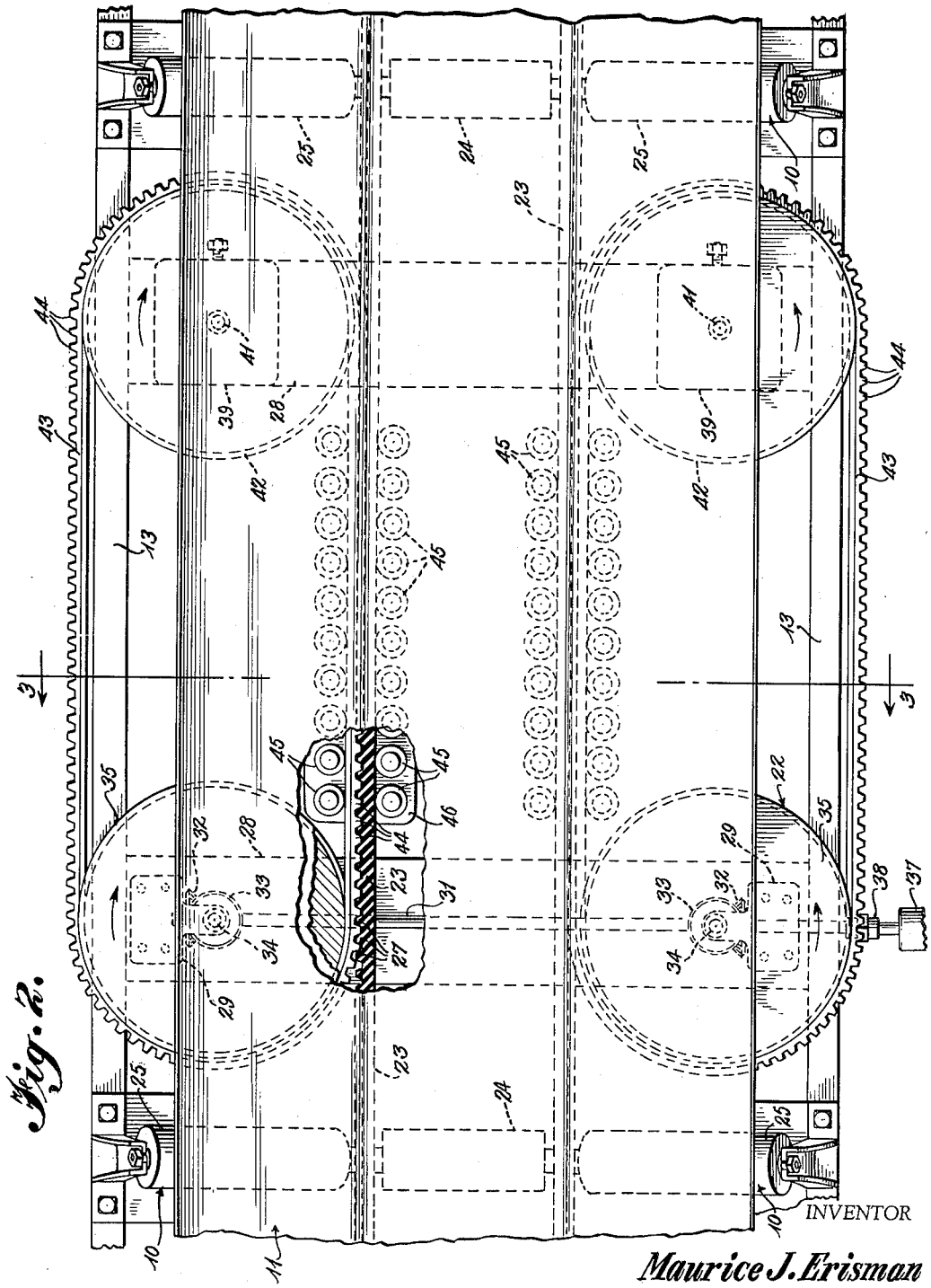

In the accompanying drawings forming a part of this specification and in which like reference characters are employed to designate like parts throughout the same, Figure 1 is a side elevational view, partly broken away, of a belt conveyor embodying this invention, Figure 2 is an enlarged top plan view of one of the conveyor drive units, and the associated portion of the conveyor belt, illustrated in Fig. 1, Figure 3 is a vertical sectional view taken on line 3—3 of Fig. 2, Figure 4 is an enlarged fragmentary view, partly in section, showing the engagement between the conveyor belt and one of the drive belts illustrated in Fig. 3, and Figure 5 is an enlarged vertical sectional view taken on line 5—5 of Fig. 1.

In the drawings, wherein for the purpose of illustration is shown a preferred embodiment of this invention, and first particularly referring to Fig. 1, reference character 6 designates a belt conveyor which includes a terminal pulley 7 at the head end of the conveyor, a terminal pulley 8 at the tail end of the conveyor, a plurality of return idlers 9, and a plurality of troughing idlers 10, all of which cooperate to support the endless conveyor belt 11. Adjacent each of the terminal pulleys 7 and 8, snubbing pulleys 12 engage the belt 11 to increase the contact areas between the belt and the terminal pulleys. The idlers 9 and 10 are mounted in a conventional manner on longitudinal channel beams 13 which are supported by vertical posts 14 on opposite sides of the conveyor 6.

The terminal pulleys 7 and 8 are mounted on channel beams 15 supported by vertical posts 17 and the snubbing pulleys 12 are mounted directly on the posts 17.

The terminal pulley 7 at the head end of the conveyor 6 is driven by a motor 18 through a speed reducer 19 and couplings 21, as is best illustrated in Fig. 5. In addition to the driving forces applied to the belt by the terminal pulley 7, intermediate drive units 22 are positioned between the active and return runs of the belt at longitudinally spaced intervals along the conveyor 6 for cooperation with the integral drive beads 23, which may take the form of spur racks, projecting from the non-load carrying surface of the belt 11.

Referring now to Figs. 2 and 4, inclusive, for a detail description of one of the identical drive units 22 and the manner in which it cooperates with the integral spur racks 23 of the belt 11, it will be noted that each of the spur racks is so positioned relative to its adjacent edge of the belt as to project downwardly from one edge of the flat middle portion of the belt as it passes over the troughing idlers 10. This positioning of the spur racks 23 provides clearance for their movement between the adjacent ends of the center roll 24 and the inclined outer rolls 25 of the troughing idlers. Each of the terminal pulleys 7 and 8 has peripheral grooves 26 to provide clearance for the spur racks 23 as the belt 11 passes thereover. Each of the spur racks 23 is formed as an integral part of the belt 11 with its outwardly facing side surface substantially normal to the non-load carrying surface of the belt and being serrated to form rack teeth 27.

Extending transversely across the conveyor 6 between the active and return runs of the belt 11 are two spaced drive supporting plates 28 having their end portions connected to the channel beams 13. One of the supporting plates 28 has mounted thereon adjacent its opposite end portions the two bearing brackets 29 which rotatably support the drive shaft 31. Keyed to the drive shaft 31 are a pair of bevel gears 32, each of which is positioned adjacent a different bracket 29. The bevel gears 32 are faced in opposite directions on the shaft 31 and each arranged to mesh with a bevel gear 33 keyed to a vertical shaft 34 which is supported by the adjacent bracket 29. Sheaves 35 are fastened to the upper end portions of the shafts 34 in horizontal alinement with the teeth 27 of the spur racks 23. The diameter of each sheave 35 is such that its grooved periphery lies closely adjacent the teeth 27. A motor 36 is connected to one end of the drive shaft 31 through a speed reducer 37 and shaft couplings 38.

The other drive supporting plate 28 has mounted thereon adjacent its opposite end portions adjustable bearing supports 39, each of which has rotatably mounted therein a vertical shaft 41 which is in longitudinal alinement with the shaft 34 on its corresponding side of the conveyor 6. Sheaves 42, identical to the sheaves 35 of the shafts 34, are mounted on the upper end portions of the shafts 41 in horizontal alinement with the teeth 27 of the spur racks 23. Trained in the grooves of each longitudinally alined pair of sheaves 35 and 42 on each side of the conveyor 6 is a drive belt 43. The outer faces of the drive belts 43 are serrated to form teeth 44 adapted to mesh with the teeth 27 of the adjacent spur racks 23. Proper tension in the drive belts 43 is provided by adjustment of the bearing supports 39 and the shafts 41 carried thereby.

Operation of the motor 36 will impart rotation to the drive shaft 31 and its bevel gears 32 so that the sheaves 35 will be rotated in opposite directions to cause the teeth 44 of the runs of the drive belts 43 which mesh with the teeth 27 of the spur racks 23 to travel in the same longitudinal direction to impart a positive driving force to the belt 11. Positive engagement between the teeth 44 and 27 is maintained at all times by the rollers 45 which engage the faces of the drive belt 43 and spur rack 23 in the manner best illustrated in Figs. 2, 3 and 4. The rollers 45 are mounted on the flanges 46 of the beams 47 which extend between and are connected to the supporting arms 48 of the troughing idlers 10.

It readily will be apparent that the number of and the spacing provided between the intermediate drive units 22 may be varied to suit the particular requirements of any given conveyor installation and that the drive units may be used either in combination with a terminal pulley drive, as illustrated, or as the sole driving medium for the conveyor. In any event, the maximum tension forces that must be applied to the conveyor belt 11 by any single drive unit will be reduced to approximately those forces necessary to impart movement to the segment of the belt between that drive unit and the next preceding drive unit. This reduction in the maximum tension forces that must be applied to any portion of the belt 11 permits the use of a much less expensive belt than would be required if the belt were driven solely at one terminal. The spacing of the spur racks 23 across the width of the conveyor belt 11 will distribute the tension forces applied to each spur rack across a substantial portion of the belt width so as to prevent failure of the belt due to areas of high stress concentration.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A belt conveyor, comprising an endless flexible conveying belt providing a continuous load carrying surface, a pair of transversely spaced longitudinally extending drive beads formed integrally with the belt and projecting from the non-load carrying surface of the belt, each of said beads having a serrated surface facing laterally outwardly and substantially normal to said non-load carrying surface, means supporting said belt for movement through an elongated closed path, and a drive unit positively engaging the serrated surface of each of said beads intermediate the ends of said closed path for driving the belt.

2. A belt conveyor, comprising an endless flexible conveying belt providing a continuous load carrying surface and having a relatively narrow serrated surface forming a part of and extending throughout the length of the non-load carrying surface of the belt, means for supporting said belt, and an endless drive belt having a serrated surface meshing with the serrated surface of said conveyor belt for driving the latter.

3. A belt conveyor, comprising an endless flexible conveying belt providing a continuous load carrying surface and having a plurality of longitudinally extending, transversely spaced relatively narrow serrated surfaces forming parts of the non-load carrying surface of the belt, means for supporting said belt, and a plurality of endless drive belts supported for movement through separate paths adjacent the serrated surfaces of said conveyor belt, each of said drive belts having a serrated surface meshing with its adjacently positioned serrated surface of the conveyor belt.

4. A belt conveyor, comprising an endless flexible conveying belt providing a continuous load carrying surface, a pair of longitudinally extending integral drive beads projecting from the non-load carrying surface of the belt at intervals spaced across its width and each having a serrated surface facing laterally outwardly, means for supporting said belt, and a pair of endless drive belts supported for movement through opposed paths positioned adjacent to and laterally outwardly of corresponding portions of the serrated surface of said drive beads, said drive belts each having a serrated surface meshing with the serrated surface of its adjacent drive bead for driving the conveyor belt.

5. A belt conveyor, comprising an endless flexible conveying belt providing a continuous load carrying surface and having a pair of longitudinally extending integral drive beads projecting from the non-load carrying surface of the belt at intervals spaced across its width and each having a serrated surface facing laterally outwardly relative to said non-load carrying surface, means for supporting said belt, and a plurality of pairs of endless drive belts located at longitudinally spaced points along the conveyor with the belts of each pair supported for movement through opposed paths positioned adjacent to and laterally outwardly of corresponding portions of the serrated surfaces of said drive beads, said drive belts each having a serrated surface meshing with the serrated surface of its adjacent drive bead for positively driving the conveyor belt.

6. A belt conveyor, comprising an endless flexible conveying belt providing a continuous load carrying surface, a pair of longitudinally extending integral drive beads projecting from the non-load carrying surface of the belt at intervals spaced across its width and each having a serrated surface facing laterally outwardly relative to said non-load carrying surface, terminal pulleys for the conveyor belt, idlers for supporting said belt between the terminal pulleys, a drive for one of said terminal pulleys, and a plurality of pairs of endless drive belts located at longitudinally spaced points between the terminal pulleys with the belts of each pair supported for movement through opposed paths adjacent to and laterally outwardly of corresponding portions of the serrated surfaces of said drive beads, said drive belts each having a serrated surface meshing with the serrated surface of its adjacent drive bead for positively driving the conveyor belt.

7. A belt conveyor, comprising an endless flexible conveying belt providing a continuous load carrying surface, a pair of longitudinally extending spur racks integral with and projecting inwardly from the non-load carrying surface of the belt at intervals spaced across its width and each having its toothed surface facing laterally outwardly, means for supporting said belt, and a pair of drive belts supported for movement through opposed paths positioned adjacent to and laterally outwardly of corresponding portions of the toothed surfaces of said racks, said drive belts each having toothed surface meshing with the adjacent spur rack of the conveyor belt for driving the latter.

8. In a belt conveyor, an endless flexible conveying belt providing a continuous load carrying surface, and a drive bead formed integrally with the belt, said drive bead projecting from and extending longitudinally of the non-load carrying surface of the belt and having a laterally outwardly facing serrated surface in substantially normal relationship with said load carrying surface.

9. In a belt conveyor, an endless flexible conveying belt providing a continuous load carrying surface, and a pair of longitudinally extending spur racks formed integrally with said belt and projecting from the non-load carrying surface of the belt at intervals spaced across its width with the toothed sides of said racks facing laterally outwardly and arranged in substantially normal relationship with said load carrying surface.

References Cited in the file of this patent

UNITED STATES PATENTS

| 636,557 | Reeves | Nov. 7, 1899 |
| 2,094,747 | Phillips | Oct. 5, 1937 |
| 2,594,342 | Pettyjohn | Apr. 29, 1952 |

FOREIGN PATENTS

| 577,801 | Germany | May 18, 1933 |